United States Patent
Wu et al.

(10) Patent No.: US 11,223,571 B2
(45) Date of Patent: *Jan. 11, 2022

(54) INTERNET RESOURCE DISTRIBUTING METHOD AND DEVICE, AND NETWORK RED-ENVELOPE DISTRIBUTING METHOD

(71) Applicant: ADVANCED NEW TECHNOLOGIES CO., LTD., Grand Cayman (KY)

(72) Inventors: Jun Wu, Hangzhou (CN); Huanmi Yin, Hangzhou (CN); Xiaodong Zeng, Hangzhou (CN); Feng Lin, Hangzhou (CN); Jiajia Li, Hangzhou (CN); Lei Jiao, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 28 days.

This patent is subject to a terminal disclaimer.

(21) Appl. No.: 16/356,400

(22) Filed: Mar. 18, 2019

(65) Prior Publication Data

US 2019/0215278 A1 Jul. 11, 2019

Related U.S. Application Data

(63) Continuation of application No. PCT/CN2017/101268, filed on Sep. 11, 2017.

(51) Int. Cl.
*H04L 12/911* (2013.01)
*G06K 9/00* (2006.01)
(Continued)

(52) U.S. Cl.
CPC .......... *H04L 47/70* (2013.01); *G06K 9/00268* (2013.01); *G06K 9/00288* (2013.01);
(Continued)

(58) Field of Classification Search
CPC ...... G06Q 20/085; G06Q 20/10; G06Q 20/18; G06Q 20/38; G06Q 20/22; G06Q 20/00;
(Continued)

(56) References Cited

U.S. PATENT DOCUMENTS

| | | | |
|---|---|---|---|
| 6,681,032 B2 | 1/2004 | Bortolussi et al. | |
| 7,171,472 B2 | 1/2007 | O'Brien et al. | |

(Continued)

FOREIGN PATENT DOCUMENTS

| CN | 1842782 B | 4/2011 |
|---|---|---|
| CN | 1906604 B | 6/2011 |

(Continued)

OTHER PUBLICATIONS

First Search for Chinese Application No. 201610833413.7 dated Aug. 22, 2019 (1 page).

(Continued)

*Primary Examiner* — Tom Y Chang

(57) ABSTRACT

The application discloses a resource distributing method and device used for improving resource distributing efficiency. The method comprises: receiving a resource distributing request and determining one or more pre-selected receiving identifiers; determining a total distributing budget for distributing a resource; determining a distributing result according to the total distributing budget and one or more pre-selected receiving accounts corresponding to the one or more pre-selected receiving identifiers, wherein the distributing result is a resource value based on which the resource is to be distributed from the sending account to a receiving account in the one or more pre-selected receiving accounts; and distributing the resource from the sending account to the receiving account according to the distributing result. The application further discloses a red-envelope distributing method.

11 Claims, 9 Drawing Sheets

(51) Int. Cl.
*H04L 29/08* (2006.01)
*G06Q 30/02* (2012.01)
*G06Q 20/40* (2012.01)

(52) U.S. Cl.
CPC ....... *G06Q 30/0207* (2013.01); *H04L 67/146* (2013.01); *H04L 67/32* (2013.01); *G06Q 20/40145* (2013.01)

(58) Field of Classification Search
CPC ............. G06Q 20/40145; G06Q 20/42; G06Q 20/4016; G06Q 20/4014; G06Q 20/06; G06Q 20/3223; G06Q 20/40; G06Q 20/405; G06Q 50/01; G06F 21/32
See application file for complete search history.

(56) References Cited

U.S. PATENT DOCUMENTS

| | | | |
|---|---|---|---|
| 7,251,647 | B2 | 7/2007 | Hoblit |
| 7,971,156 | B2 | 6/2011 | Albertson et al. |
| 8,447,829 | B1 | 5/2013 | Geller et al. |
| 9,002,727 | B2 | 4/2015 | Horowitz et al. |
| 9,918,183 | B2 | 3/2018 | Rhoads et al. |
| 10,230,819 | B2 | 3/2019 | Richardson et al. |
| 2002/0062257 | A1 | 5/2002 | Minamishin et al. |
| 2002/0083178 | A1 | 6/2002 | Brothers |
| 2004/0228504 | A1* | 11/2004 | Chang ................ G06K 9/00288 382/118 |
| 2005/0044206 | A1 | 2/2005 | Johansson et al. |
| 2005/0138192 | A1 | 6/2005 | Encarnacion et al. |
| 2005/0138193 | A1 | 6/2005 | Encarnacion et al. |
| 2008/0071909 | A1 | 3/2008 | Young et al. |
| 2011/0072360 | A1 | 3/2011 | Patrick et al. |
| 2013/0223352 | A1 | 8/2013 | Sartori et al. |
| 2014/0304069 | A1 | 10/2014 | Lacey et al. |
| 2016/0012465 | A1* | 1/2016 | Sharp .................... G06Q 20/10 705/14.17 |
| 2016/0154991 | A1* | 6/2016 | Berini ................ G06K 9/00013 382/116 |
| 2016/0234302 | A1 | 8/2016 | Wu et al. |
| 2016/0239881 | A1 | 8/2016 | Bhandari et al. |
| 2016/0306821 | A1 | 10/2016 | O'Brien et al. |
| 2017/0124540 | A1* | 5/2017 | Chan .................. G06Q 20/204 |
| 2017/0323299 | A1* | 11/2017 | Davis ................. G06Q 20/204 |

FOREIGN PATENT DOCUMENTS

| | | |
|---|---|---|
| CN | 102521623 A | 6/2012 |
| CN | 103973769 A | 8/2014 |
| CN | 104837123 A | 8/2015 |
| CN | 105096137 A | 11/2015 |
| CN | 105099877 A | 11/2015 |
| CN | 105099879 A | 11/2015 |
| CN | 105825384 A | 8/2016 |
| CN | 105869018 A | 8/2016 |
| CN | 105894288 A | 8/2016 |
| CN | 105915437 A | 8/2016 |
| CN | 107018168 A | 8/2017 |
| CN | 104160726 B | 4/2019 |
| EP | 1428356 B1 | 4/2007 |
| JP | 2011-155385 A | 8/2011 |
| JP | 2012-231208 A | 11/2012 |
| KR | 101424837 B1 | 8/2014 |
| WO | 2014152069 A2 | 9/2014 |

OTHER PUBLICATIONS

First Office Action for Chinese Application No. 201610833413.7 dated Sep. 3, 2019 (5 pages).
Taiwanese Office Action for Taiwanese Application No. 106124377 dated Feb. 14, 2019 (6 pages).
Written Opinion of the International Searching Authority and International Search Report for PCT Application No. PCT/CN2017/101268 dated Dec. 7, 2017 (14 pages).
International Preliminary Report on Patentability Chapter I for PCT Application No. PCT/CN2017/101268 dated Mar. 28, 2019 (12 pages).
Office Action for Korean Application No. 10-2019-7011096 dated May 25, 2020.
Office Action for Japanese Application No. 2019-515414 dated Jun. 9, 2020.
Second Office Action for Chinese Application No. 201610833413.7 dated Mar. 2, 2020.
Chen Xiaosheng, "Need to confirm the transfer?—May not be as simple as you think", Woshipm, Feb. 14, 2016, http://www.woshipm.com/pd/280075.html.
First Examination Report for Indian Application No. 201947015018 dated Mar. 31, 2021.
Office Action for Korea Application No. 10-2019-7011096, dated Nov. 24, 2020, 7 pages.

* cited by examiner

INTERNET RESOURCE DISTRIBUTING METHOD AND DEVICE, AND NETWORK RED-ENVELOPE DISTRIBUTING METHOD

CROSS-REFERENCE TO RELATED APPLICATIONS

The present application is a continuation application of International Patent Application No. PCT/CN2017/101268, filed on Sep. 11, 2017, which is based on and claims priority to the Chinese Patent Application No. 201610833413.7, filed on Sep. 19, 2016 and entitled "Internet Resource Distributing Method and Device, and Network Red-Envelope Distributing Method." The above-referenced applications are incorporated herein by reference in their entirety.

TECHNICAL FIELD

The application relates to the field of computer technologies, and in particular, to an Internet resource distributing method and device, and a network red-envelope distributing method.

BACKGROUND

With the development of Internet information technologies, a variety of Internet resources (e.g., network storage resources, network point resources, and the like, which are referred to as resources in short) have emerged. Based on the characteristics of the "resources," the resources typically should not be left unused for a long time. The resources should be in use as much as possible, either used by an owner or used by another party, thereby maximizing the usefulness of the resources. Therefore, resource distributing has appeared in the Internet, which achieves optimized configurations of resources through resource distributing (or exchange) between two parties or among multiple parties. For example, one party shares network point resources, another party or parties obtain the network point resources, and the obtained resource value can be randomly allocated according to the shared resource value or according to a preset percent.

During resource distributing in current technologies, it is necessary for a sending party (a sending account) to first select a single receiving party (a receiving account) or a group comprising a plurality of receiving accounts, turn on a sending function, then select a resource value (as well as a number of resource pieces if needed), and lastly confirm the sending. This resource distributing process according to the current technologies includes at least four steps of operations (or five steps of operations if the selection of a number of resource pieces is included), or up to six steps of operations if a message needs to be added. Moreover, the receiving account also needs to be turned on to receive the resources. Therefore, in the resource distributing process according to the current technologies, the sending account needs to execute multiple steps of operations, while the receiving account also needs to execute at least one step of operations. In other words, a terminal of the sending account needs to receive instructions for a number of times, and a terminal of the receiving account also needs to receive instructions, which severely affects the resource distributing efficiency.

SUMMARY

Embodiments of the specification provide an Internet resource distributing method, an Internet resource distributing device used for improving Internet resource distributing efficiency.

The embodiments of the specification also provide a network red-envelope distributing method used for improving network red-envelope distributing efficiency.

The resource distributing method may comprises: receiving a resource distributing request and determining one or more pre-selected receiving identifiers; determining a total distributing budget for distributing a resource; determining a distributing result according to the total distributing budget and one or more pre-selected receiving accounts corresponding to the one or more pre-selected receiving identifiers, wherein the distributing result includes a resource value based on which the resource is to be distributed from a sending account to a receiving account in the one or more pre-selected receiving accounts; and distributing the resource from the sending account to the receiving account according to the distributing result.

In some embodiments, the determining one or more pre-selected receiving identifiers comprises: determining a facial identifier according to an obtained facial image; and determining the facial identifier as one of the one or more pre-selected receiving identifier.

In other embodiments, the determining a facial identifier comprises: determining the facial identifier through facial recognition.

In still other embodiments, the determining the facial identifier through facial recognition comprises: determining candidate facial identifiers through a facial recognition process; obtaining facial features corresponding to the candidate facial identifiers extracted from the facial recognition process; and determining the facial identifier from the candidate facial identifiers according to the facial features and a preset feature screening rule.

In yet other embodiments, the determining a distributing result according to the total distributing budget and one or more pre-selected receiving accounts corresponding to the one or more pre-selected receiving identifiers comprises: determining a distributing result according to the total distributing budget and the one or more pre-selected receiving accounts and facial features corresponding to the one or more pre-selected receiving identifier.

In other embodiments, the determining a distributing result according to the total distributing budget and one or more pre-selected receiving accounts corresponding to the one or more pre-selected receiving identifiers comprises: determining a receiving account according to the one or more pre-selected receiving accounts corresponding to the one or more pre-selected receiving identifiers; and determining a distributing result according to the total distributing budget and the receiving account.

In still other embodiments, the determining a distributing result according to the total distributing budget and one or more pre-selected receiving accounts corresponding to the one or more pre-selected receiving identifiers comprises: determining candidate distributing results according to the total distributing budget and the one or more pre-selected receiving accounts corresponding to the one or more pre-selected receiving identifiers; determining a receiving account according to the one or more pre-selected receiving accounts corresponding to the one or more pre-selected receiving identifiers; and determining a distributing result from the candidate distributing results according to the receiving account.

In yet other embodiments, the determining a receiving account according to the one or more pre-selected receiving accounts corresponding to the one or more pre-selected receiving identifiers comprises: determining a receiving account from the one or more pre-selected receiving accounts corresponding to the one or more pre-selected receiving identifiers according to an account screening rule preset by the sending account.

The Internet resource distributing device may comprises: one or more processors and one or more non-transitory computer-readable memories coupled to the one or more processors and configured with instructions executable by the one or more processors to cause the device to perform operations comprising: receiving a resource distributing request and determines one or more pre-selected receiving identifiers; determining a total distributing budget for distributing a resource; determining a distributing result according to the total distributing budget and one or more pre-selected receiving accounts corresponding to the one or more pre-selected receiving identifiers, wherein the distributing result includes a resource value based on which the resource is to be distributed from a sending account to a receiving account in the one or more pre-selected receiving accounts; and distributing the resource from the sending account to the receiving account according to the distributing result.

The network red-envelope distributing method may comprises: receiving a network red-envelope distributing request and determining one or more pre-selected receiving identifiers; determining a total distributing budget for distributing a plurality of network red-envelopes; determining a distributing result according to the total distributing budget and one or more pre-selected receiving accounts corresponding to the one or more pre-selected receiving identifiers, wherein the distributing result includes an amount based on which the network red-envelopes are to be distributed from a sending account to a receiving account in the one or more pre-selected receiving accounts; and distributing the one or more network red-envelopes from the sending account to the receiving account according to the distributing result.

In some embodiments, the determining one or more pre-selected receiving identifiers comprises: determining a facial identifier according to an obtained facial image; and determining the facial identifier as one of the one or more pre-selected receiving identifier.

In other embodiments, the determining a facial identifier comprises: determining the facial identifier through facial recognition.

In still other embodiments, the determining the facial identifier through facial recognition comprises: determining candidate facial identifiers through a facial recognition process; obtaining facial features corresponding to the candidate facial identifiers extracted from the facial recognition process; and determining the facial identifier from the candidate facial identifiers according to a preset feature screening rule.

In yet other embodiments, the determining a distributing result according to the total distributing budget and one or more pre-selected receiving accounts corresponding to the one or more pre-selected receiving identifiers comprises: determining a distributing result according to the total distributing budget and the one or more pre-selected receiving account and facial features corresponding to the one or more pre-selected receiving identifiers.

In other embodiments, the determining a distributing result according to the total distributing budget and one or more pre-selected receiving accounts corresponding to the one or more pre-selected receiving identifiers comprises: determining a receiving account according to the one or more pre-selected receiving accounts corresponding to the one or more pre-selected receiving identifiers; and determining a distributing result according to the total distributing budget and the receiving account.

In still other embodiments, the determining a distributing result according to the total distributing budget and one or more pre-selected receiving accounts corresponding to the one or more pre-selected receiving identifiers comprises: determining candidate distributing results according to the total distributing budget and the one or more pre-selected receiving accounts corresponding to the one or more pre-selected receiving identifiers; determining a receiving account according to the one or more pre-selected receiving accounts corresponding to the one or more pre-selected receiving identifiers; and determining a distributing result from the candidate distributing results according to the receiving account.

In yet other embodiments, the determining a receiving account according to the one or more pre-selected receiving accounts corresponding to the one or more pre-selected receiving identifiers comprises: determining a receiving account from the one or more pre-selected receiving accounts corresponding to the one or more pre-selected receiving identifiers according to an account screening rule preset by the sending account.

The above embodiments of the specification can achieve the following advantageous effects: after a terminal receives a resource distributing request and determines one or more pre-selected receiving identifiers according to a user input, the distributing can be completed as a resource value budget has been preset. By presetting the resource value budget, a sending party can complete a distributing process through initiating a request and inputting a receiving account identifier when distributing resources. Compared with the current technologies, many operations may be eliminated for the sending account during the resource distributing, while the receiving party may have a unique identifier for receiving the Internet resources, thereby improving the resource distributing efficiency.

BRIEF DESCRIPTION OF THE DRAWINGS

The accompanying drawings herein are used to provide a further understanding of the application and constitute a part of the application. The illustrative embodiments are used to describe the application, and do not constitute an inappropriate limitation to the application. In the accompanying drawings.

DETAILED DESCRIPTION

To make the objectives, technical solutions, and advantages of the application clearer, the technical solutions of the application will be clearly and completely described below with reference to the embodiments and accompanying drawings of the application. Apparently, the described embodiments are merely some, but not all, embodiments of the application. All other embodiments obtainable by a person skilled in the art without creative effort and based on the embodiments of the application shall fall within the scope of the application.

Figure 1:
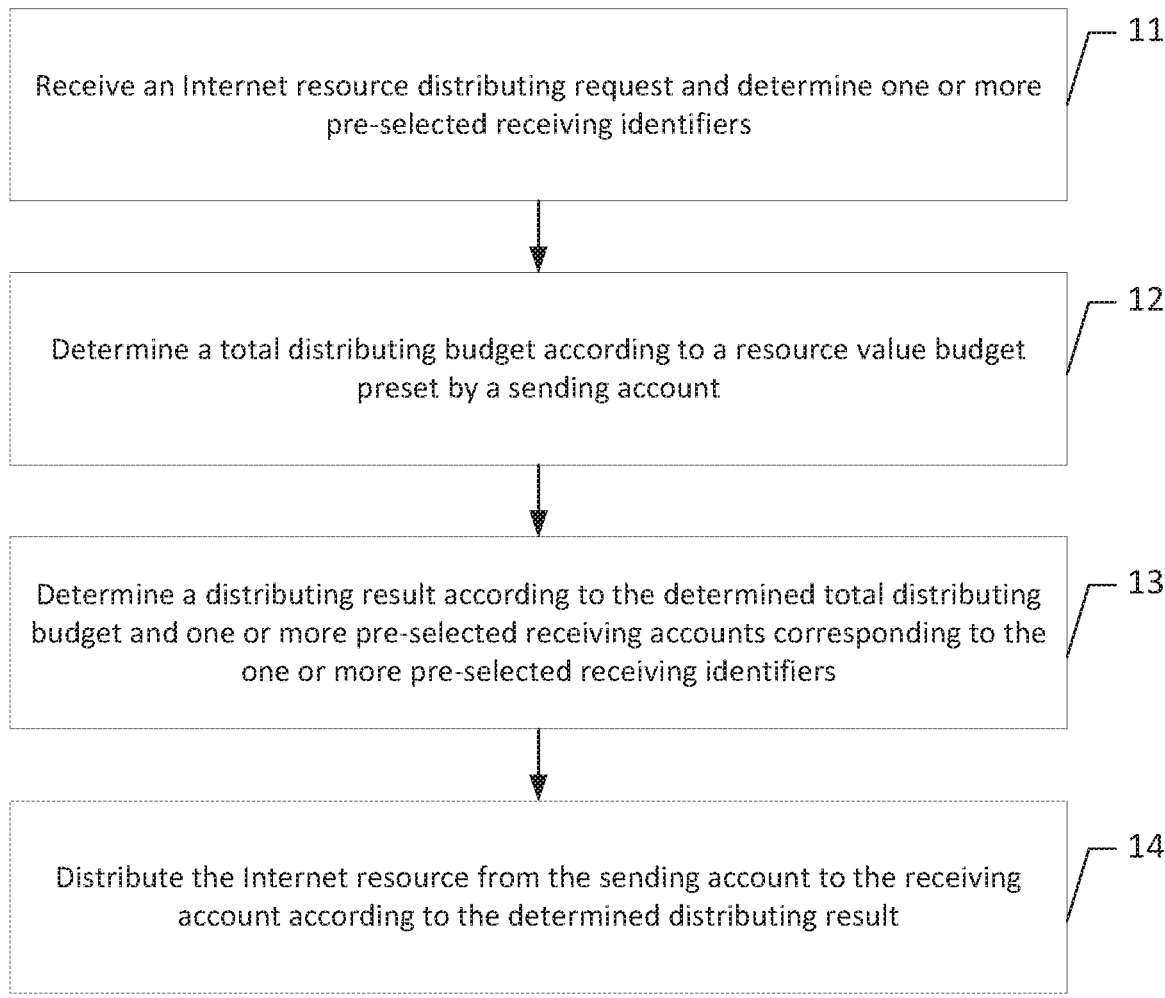
FIG. 1 is a flow chart of an Internet resource distributing method according to some embodiments of the application.
Figure 2:
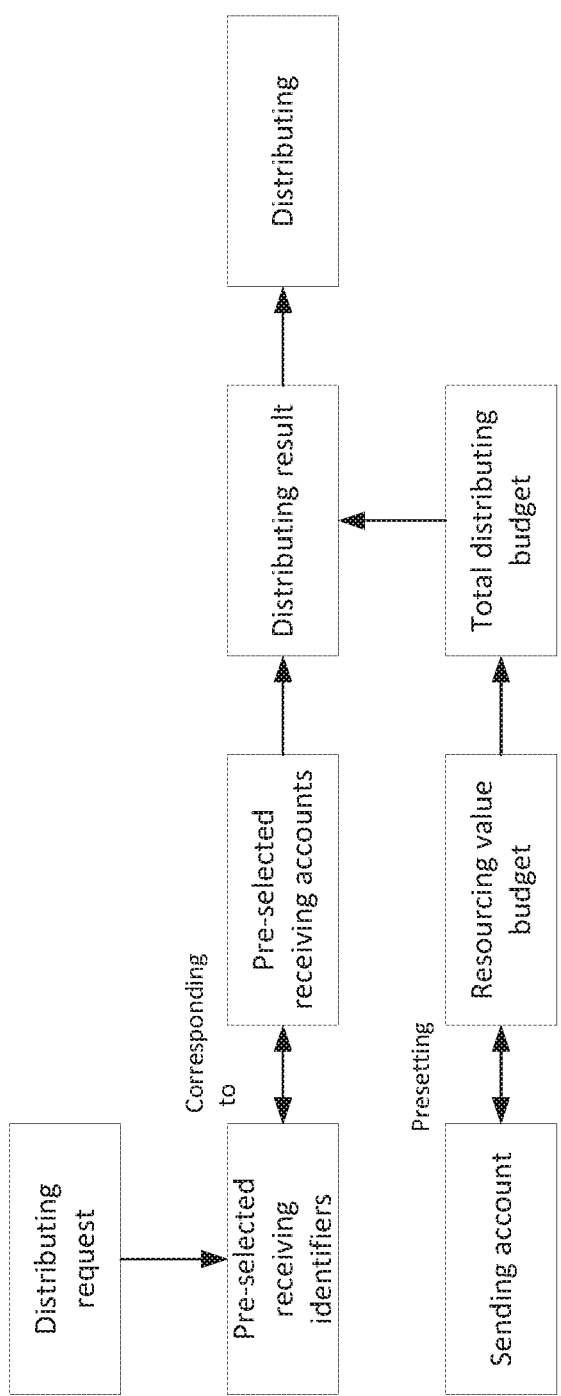
FIG. 2 is a schematic diagram of the Internet resource distributing method according to other embodiments of the application.

As described above, when performing Internet resource distributing according to the current technologies, a sending account needs to perform multiple steps of operations, and a receiving account also needs to perform at least one step of operations. In other words, the sending account terminal needs to receive multiple instructions, and the receiving account terminal also needs to receive instructions. Using sending points as an example, first, a click instruction is received to determine a single receiving account or a group comprising a plurality of receiving accounts; next, a point distributing instruction is received, and a point distributing function is turned on; subsequently, a point value input by a sending account is received (as well as a number of input pieces in the case of sending to a plurality of receiving accounts); and lastly, a sending instruction is received to send the whole point resource (comprising a plurality of pieces) to the receiving account (or the group), and when the receiving account (or the group) finds the point resource, the receiving account terminal receives one click instruction to obtain the whole point resource (or a piece of the whole point resource). In some examples, it is very likely that two click instructions are received to complete operations of selection and obtaining, respectively. Apparently, when performing Internet resource distributing according to current technologies, a user needs to execute all main operations including many steps, which severely affects the resource distributing efficiency. If a user mis-operation occurs, the resource distributing efficiency will be further lowered. Based on this drawback, the application provides an Internet resource distributing method for improving the resource distributing efficiency. The flow charts of the method are shown in FIG. 1 and FIG. 2. Assuming that the execution entity is a mobile terminal, the method comprises the following steps:

Step 11: receiving an Internet resource distributing request and determining one or more pre-selected receiving identifiers.

In some embodiments, a resource distributing request can be sent when resource distributing is needed. For example, a sending account can send the resource distributing request through a click instruction or through a voice instruction. Upon receiving the Internet resource distributing request, the mobile terminal responds to the request and determines one or more pre-selected receiving identifiers. For example, identifier(s) of a single or plurality of receiving accounts selected by the sending account can be received. In another example, an identifier capable of uniquely representing the pre-selected receiving account sent by a user can be received, such as a mobile phone number, a membership number, and the like.

In some embodiments, to further facilitate operations by the sending account, the sending account may be allowed to send facial images. For example, determining pre-selected receiving identifiers can comprise: determining a facial identifier according to an obtained facial image; and determining the facial identifier as one of the pre-selected receiving identifiers. A facial image can be collected by receiving a photo having the face of a receiving party designated by the user or directly through an image collection device. For example, after sending the Internet resource distributing request, the sending party sends the photo having the face of the receiving party.

Figure 3:
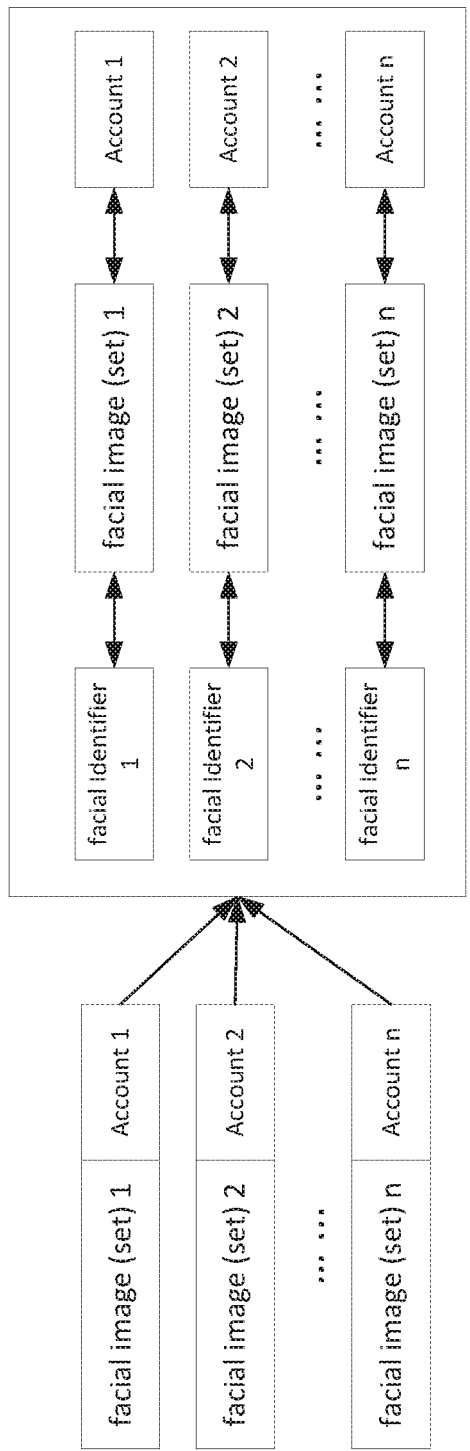
FIG. 3 is a schematic diagram of facial registration according to some embodiments of the application.

When the facial image is received, a facial identifier can be determined based on the facial image. The determined facial identifier can be used as one of the pre-selected receiving identifiers. For example, a facial registration process is shown in FIG. 3, where the user registers one or more images comprising faces, and the server for registration services assigns a unique facial identifier to the one or more images comprising faces and can establish a corresponding relationship between the facial identifier and the user's account based on the one or more images. For example, the facial identifier corresponding to "facial image 0001" is "0001," and when "facial image 0001" is obtained, the facial identifier "0001" can be determined according to the corresponding relationship stored in the server for registration services, thereby determining that the pre-selected receiving identifier is "0001."

Figure 4:
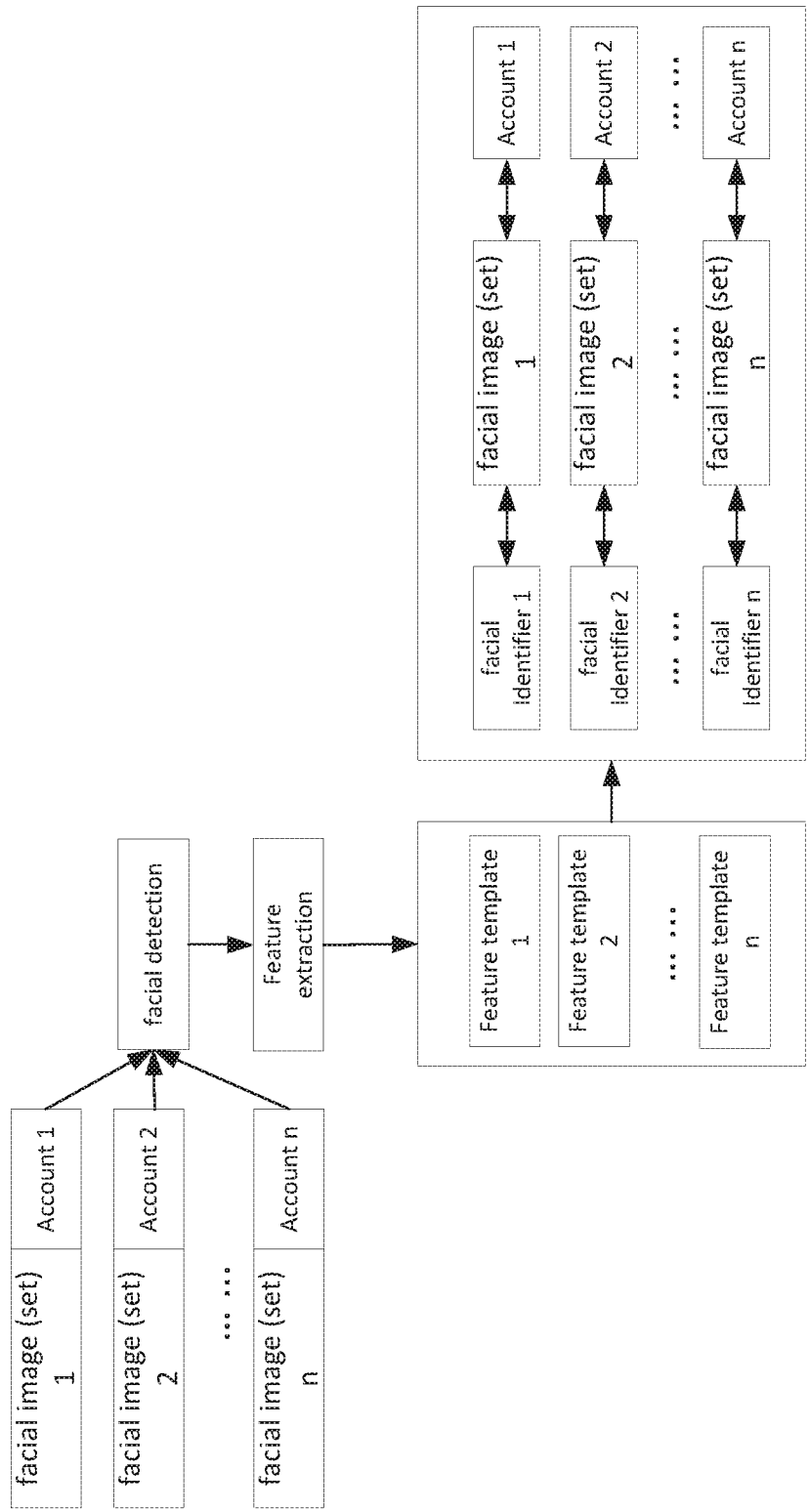
FIG. 4 is a schematic diagram of facial registration according to other embodiments of the application.

In the facial registration process shown in FIG. 4, a facial identifier is created for a facial image in advance through facial recognition. The facial identifier may be globally unique, i.e., "one face corresponds to one facial identifier." After registration starts, an image comprising a face is obtained from registration by a user, or an image comprising a face is obtained in real time through an image collection device; a facial region is determined through facial recognition, and then facial features are extracted; a feature template is created according to the facial features, the template comprises features in the face of the registered user, and the features may be as comprehensive as possible; after the feature template is determined, a facial identifier is assigned to the registered user. Moreover, the feature template can be used as a bridge for establishing a corresponding relationship between facial identifiers and accounts.

Figure 5:
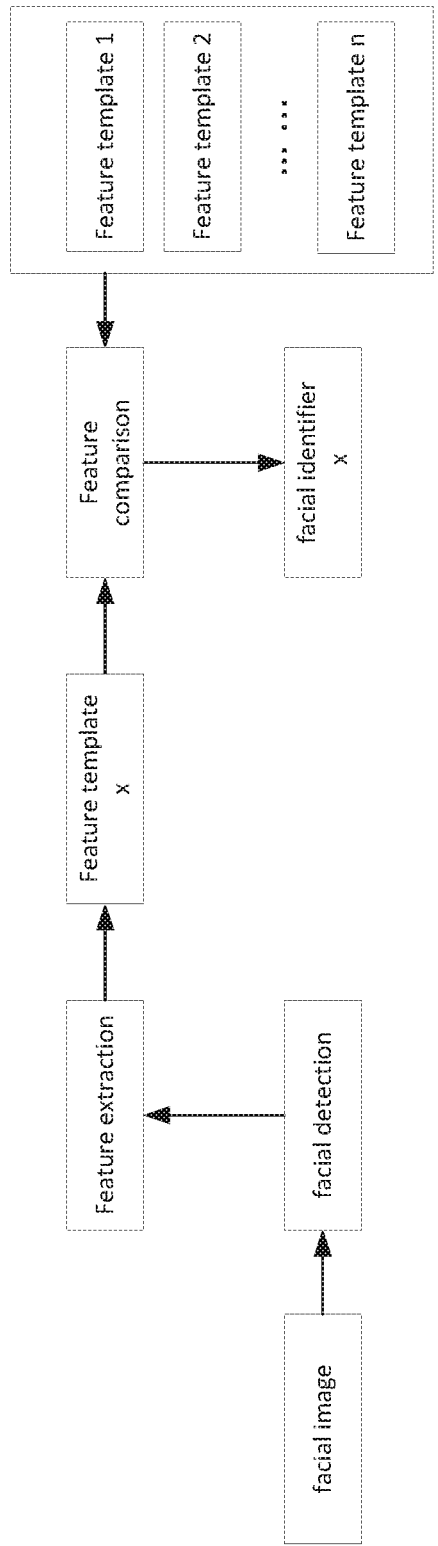
FIG. 5 is a schematic diagram of facial recognition according to still other embodiments of the application.

According to the registration process shown in FIG. 4, a facial identifier can be determined using the feature template. Therefore, determining a facial identifier according to an obtained facial image can comprise: determining the facial identifier through facial recognition according to an obtained facial image. For example, as shown in FIG. 5, after a facial image is obtained, facial detection can be conducted to determine a facial region, then facial features are extracted, and lastly, a facial identifier is determined according to comparison between the extracted facial features and those in the feature template established during the registration process. Therefore, the reason why the features may be as comprehensive as possible as described above is for accurately recognizing a facial identifier during a facial recognition process.

In some embodiments, the registration process shown in FIG. 4 can also encompass the registration process shown in FIG. 3 and integrate the facial image itself into the corresponding relationship between facial identifiers and accounts to form a corresponding relationship among the three. This way, the facial recognition process can be omitted when determining the facial identifier according to an obtained facial image, and the facial identifier can be determined according to the corresponding relationship between facial images and facial identifiers, thereby saving computation resources.

In some embodiments, the process of obtaining a facial image can include obtaining an image comprising one or more faces at one time, such as a group photo that has a plurality of faces in one photo; alternatively, a photo comprising one face can be obtained each time for multiple times. For example, photos are taken of three people at three times to obtain three images each having one face.

Step 12: determining a total distributing budget according to a resource value budget preset by the sending account.

It has been described above that the sending account can send the resource distributing request through a click instruction. Here, there can be multiple sending accounts or one sending account. In some embodiments, requests may be sent by one sending account. Moreover, in some embodiments, the sending account can preset a resource value budget as the maximum value for each resource to be distributed. For example, when sending point resources, the sending account presets the resource value budget to be 10 points. Then, each distribution of the points may be limited to 10 points.

Although distributing requests are typically sent by one sending account, there can be a plurality of sending accounts for conducting resource distributing, and each sending account can preset a resource value budget. In some embodiments, a sending account can preset no resource value budget, which can be regarded as not sending resources, i.e., the preset resource value budget is 0. Alternatively, a sending account can preset the resource value budget to be infinite, and then the maximum resource value in the account can be regarded as the preset resource value budget.

It has been described in the registration process shown in FIG. 4 that there is a corresponding relationship between facial identifiers and accounts. Therefore, in this step, an account corresponding to the facial image obtained in Step 11 can also be determined as the sending account, and a preset resource value budget is obtained.

After resource value budgets preset by one or more sending accounts are obtained, a total distributing budget can be determined. The total distributing budget refers to a total amount of resource values of Internet resources to be distributed in a distributing process.

Given that the sending accounts in this step can be different from the accounts corresponding to the pre-selected receiving identifiers or the accounts corresponding to the obtained facial images through facial identifiers determined in Step 11, e.g. an account 1 sends Internet resources to an account 2, an account 3, and an account 4, the process to determine the total distributing budget may not be related to whether a distributing request is received. In other words, Step 11 and Step 12 can be executed simultaneously, or according to an arbitrary order. However, if the obtained (multiple) facial images are used as (multiple) sending parties as described above, Step 11 may be executed first, followed by the execution of Step 12. This can be flexible in the actual applications.

Step 13: determining a distributing result according to the determined total distributing budget and one or more pre-selected receiving accounts corresponding to the one or more pre-selected receiving identifiers.

After the pre-selected receiving identifiers and the total distributing budget are determined in the preceding two steps, a distributing result can be determined in this step according to the total distributing budget and pre-selected receiving accounts corresponding to the pre-selected receiving identifiers. For example, random allocation can be made. The account 1 sends Internet resources to the account 2, the account 3, and the account 4, and the total distributing budget is 10 points. Then, it can be randomly determined that 3 points, 5 points, and 2 points are distributed to the account 2, the account 3, and the account 4, respectively; alternatively, 6 points, 4 points, and 0 points are distributed to the account 2, the account 3, and the account 4, respectively, i.e., no resources will be distributed to the account 4. Therefore, the distributing result includes a resource value for distributing an Internet resource from the sending account to a receiving account in the pre-selected receiving accounts. The resource value may refer to the amount of the resource to be distributed from the sending account to a receiving account. The accounts corresponding to the pre-selected receiving identifier can all be receiving accounts or partially be receiving accounts (e.g., there are three accounts corresponding to the pre-selected receiving identifier, while the Internet resources may be only distributed to two of the accounts).

Step 14: distributing the Internet resource from the sending account to the receiving account according to the determined distributing result.

The distributing result has been determined in the preceding step, e.g., the account 1 distributes 6 points and 4 points to the account 2 and the account 3, respectively. Then, at Step 14, the distributing plan can be executed.

Using the resource distributing method provided above, after a terminal receives a resource distributing request and determines one or more pre-selected receiving identifiers according to a user input, the distributing can be completed as a resource value budget has been preset. By presetting the resource value budget, a sending party can complete a distributing process through initiating the request and inputting a receiving account identifier when distributing resources. Compared with the current technologies, many operations may be eliminated for the sending account during the resource distributing, while the receiving party may have a unique identifier for receiving the Internet resources, thereby improving the resource distributing efficiency.

When the user input is a facial image, the pre-selected receiving identifiers can still be determined, as facial images have been registered in advance. If the distributing is performed through facial images, the facial image registration may be made in advance, and the sending party may preset a resource value budget. Then, when distributing resources, the distributing process can be completed through initiating a request and inputting a facial image. In addition, operations can only be executed online by terminals according to the current technologies. Although there is no limitation to geographic positions when the operations are executed via the Internet or the mobile Internet, the operations cannot be executed through offline interactions. For example, even when the sending party and the receiving party are face to face, they can only interact online to carry out the operations and cannot execute the operations through offline "communications." In the embodiments of the specification, when the distributing is carried out through facial images, offline interactions can be increased through, for example, taking group photos or individual photos for multiple times. If an image comprising a plurality of faces is obtained through an image collection device, resource distributing can be achieved through one sending of a request and one photo taking for each resource value distributing, which improves the resource distributing efficiency to the maximum degree and moreover, increases offline interactions.

Figure 6:
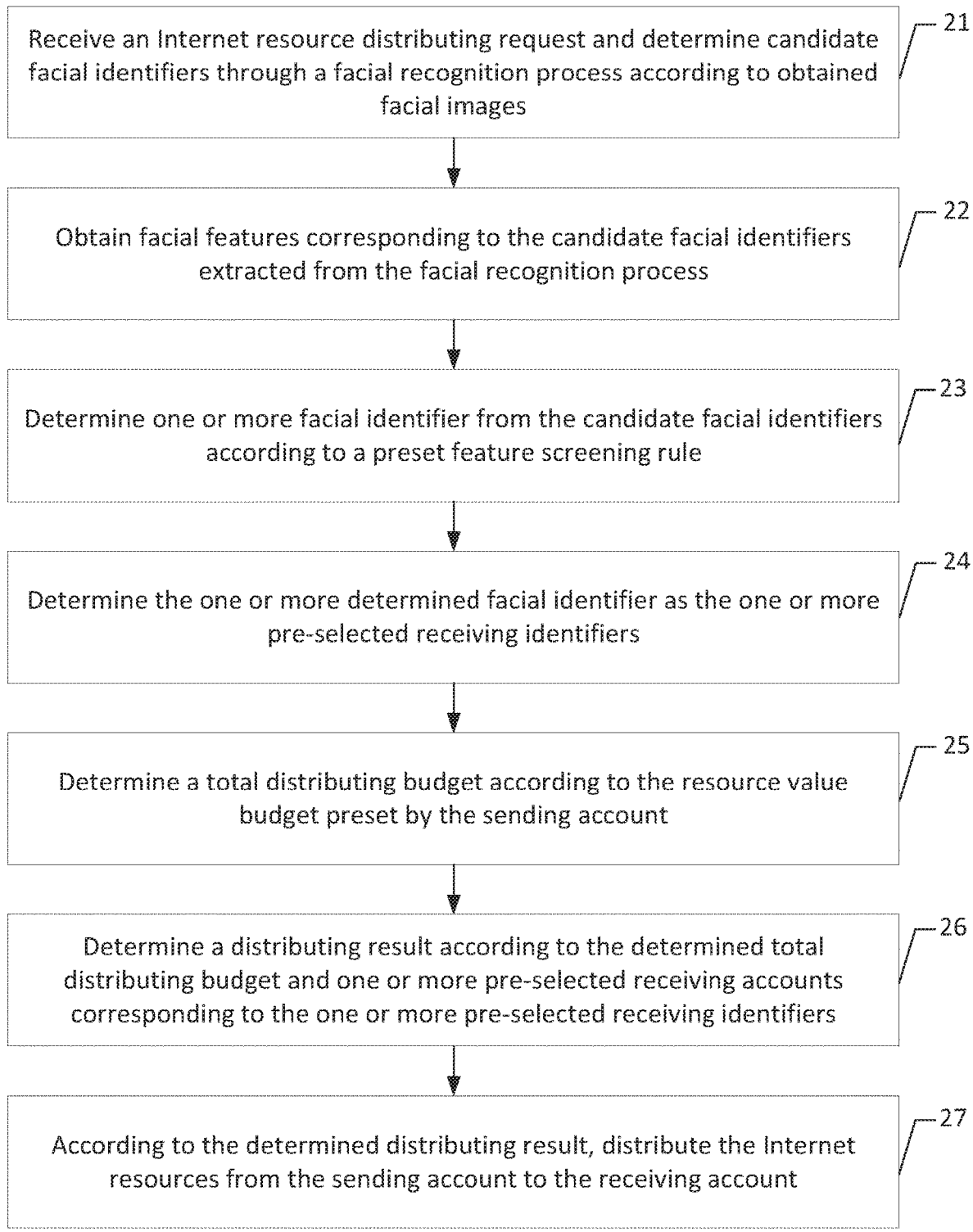
FIG. 6 is a flow chart of an Internet resource distributing method according to other embodiments of the application.
Figure 7:
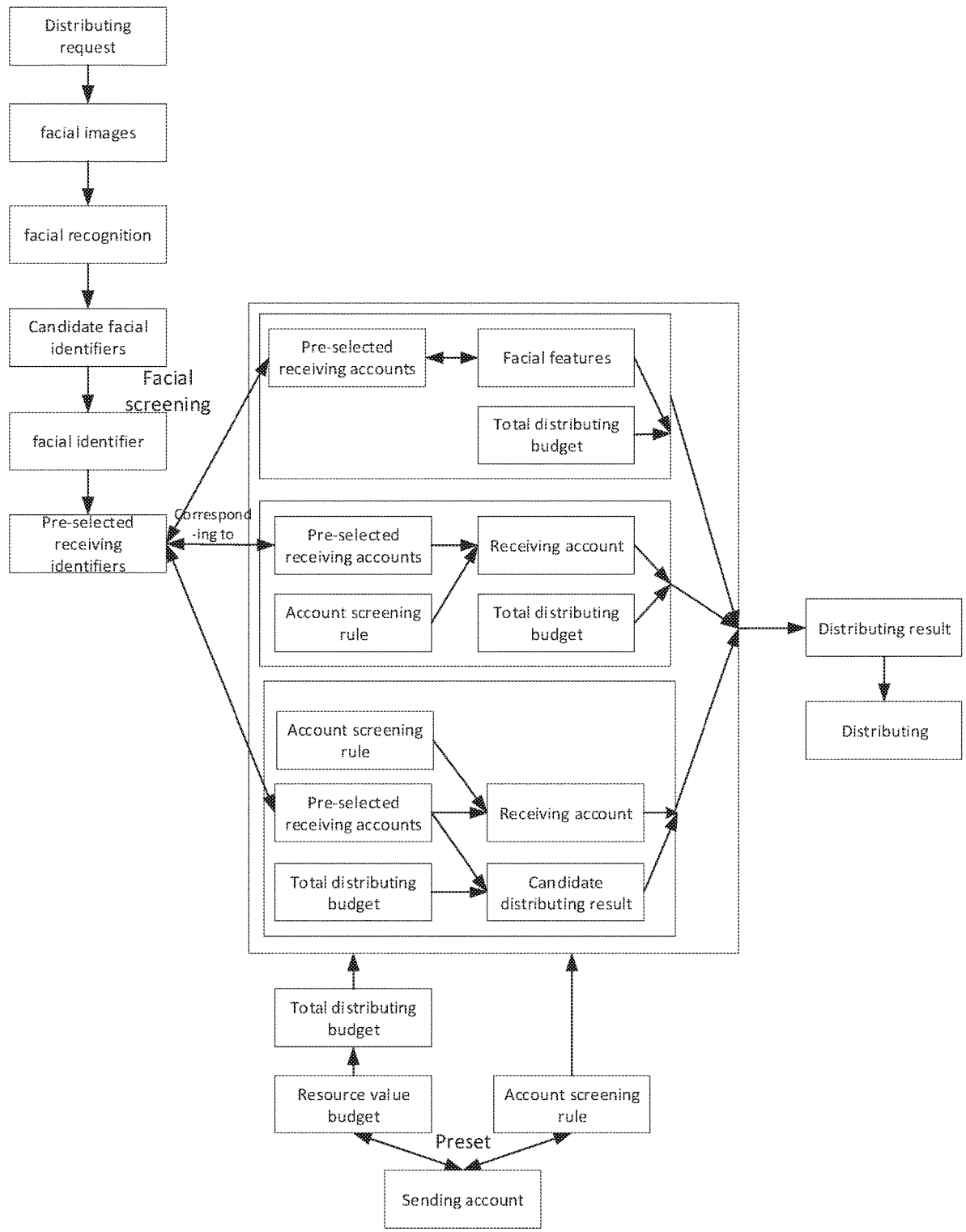
FIG. 7 is a schematic diagram of the Internet resource distributing method according to still other embodiments of the application.

It has been described above that facial features may be extracted in either the facial registration process or the facial recognition process. A face has many features, such as shape, size, positional relationship among five sensory organs, and the like. Therefore, when resource distribution is performed through facial images, facial features can also be used as a factor in the resource distributing process. On the basis of the embodiments described above and based on the same concept, the embodiments of the specification provide another Internet resource distributing method for improving interactivity while improving the resource distributing efficiency. The flow charts of the method are shown in FIG. 6 and FIG. 7. Assuming that the execution entity is still a mobile terminal, the method comprises the following steps:

Step 21: receiving an Internet resource distributing request and determining candidate facial identifiers through a facial recognition process according to obtained facial images.

The facial registration process and the facial recognition process have been described above, and will not be repeated herein. At this Step 21, candidate facial identifiers are determined through facial recognition. As indicated by the term "candidate," the candidate facial identifiers may be screened in subsequent steps.

Step 22: obtaining facial features corresponding to the candidate facial identifiers extracted from the facial recognition process.

Facial recognition has been conducted in the facial recognition process in Step 21. It has been described above that facial features may be extracted in the facial recognition process, and the facial features corresponding to the candidate facial identifiers extracted during the facial recognition can be obtained in this Step 22.

Step 23: determining one or more facial identifiers from the candidate facial identifiers according to a preset feature screening rule.

The feature screening rule can be preset. For example, facial (or eye) size can be used as the screening rule to screen out facial sizes that meet a threshold. Alternatively, facial sizes can be sorted in a descending order, and the first three are selected. In yet another example, a degree of "smile" is used as the screening rule to determine the degree of "smile" on each face through the facial features, and the candidate facial identifiers are sorted in a descending order based on their degrees of "smile", and the first three are selected. Therefore, determining the facial identifier from the candidate facial identifiers is to determine all or some of the candidate facial identifiers as the one or more facial identifiers.

Step 24: determining the one or more determined facial identifiers as the one or more pre-selected receiving identifiers.

Similar to Step 11 in the above embodiments, all facial identifiers can be directly determined as the pre-selected receiving identifiers.

Step 25: determining a total distributing budget according to the resource value budget preset by the sending account.

This Step 25 is similar to Step 12 in the above embodiments, and will not be repeated here.

Step 26: determining a distributing result according to the determined total distributing budget and one or more pre-selected receiving accounts corresponding to the one or more pre-selected receiving identifiers.

The manner of random allocation is described above. In some embodiments, the following three manners may be used to determine a distributing result.

The first manner: since facial features are obtained and screened in Step 22 and Step 23, At this Step 26, the facial features may be used as a factor to determine a distributing result. Therefore, an alternative step, may further include determining a distributing result according to the determined total distributing budget and the one or more pre-selected receiving accounts and facial features corresponding to the one or more pre-selected receiving identifiers.

For example, the facial features corresponding to the pre-selected receiving identifiers have been retained after the screening in Step 23. Therefore, when sorting is performed according to the facial features, a distributing result can be determined according to the sorting result. For example, three facial identifiers with the largest facial sizes are screened as pre-selected receiving identifiers, and then the total distributing budget can be allocated proportionally according to the sorted sequence, such as 70% for the first, 20% for the second, 10% for the third, and the like. In another example, the allocation is made according to a degree of "smile." A resource value $x1$ is allocated to the one that has the highest degree of "smile," a resource value $x2$ is allocated to the one that has the second highest degree of "smile," and a resource value $x3$ is allocated to the one that has the third highest degree of "smile," wherein $x1>x2>x3$, and $x1+x2+x3$ is smaller than or equal to the total distributing budget.

In some embodiments, when a group photo is taken, there may be people having a relatively distant relationship with the sending account, such as non-friends or a blacklist in instant messaging (social) software; there may also be people having a relatively close relationship, such as parents, lover, children, and the like. It has been described above that the sending account can preset a resource value budget. Based on the distant and close relationships, the following two manners may also be used to determine a distributing result.

The second manner: an alternative step may include determining a receiving account according to the one or more pre-selected receiving accounts corresponding to the one or more pre-selected receiving identifiers; and determining a distributing result according to the determined total distributing budget and the receiving account.

The pre-selected receiving identifiers are determined in Step 24, and therefore, the pre-selected receiving accounts corresponding to the pre-selected receiving identifiers can be obtained. As described above, there may be receiving accounts in the pre-selected receiving accounts having a relatively distant relationship with the sending account. Therefore, the receiving accounts can be determined according to these pre-selected receiving accounts. For example, the receiving accounts can be determined according to a friend list in the instant messaging software. If a pre-selected receiving account has a friend relationship with the sending account, the pre-selected receiving account can be determined as a receiving account, and if the account does not have a friend relationship with the sending account, the pre-selected receiving account is filtered out. Then, a distributing result is determined according to the determined total distributing budget and the receiving account.

For example, an account 1 is the sending account, the total distributing budget is 10 points, and the determined pre-selected receiving accounts are an account 5, an account 6, an account 7, and an account 8, but the account 7 does not have a close relationship to the account 1, such as a friend relationship. Therefore, it can be determined that the receiving accounts are the account 5, the account 6, and the account 8, and according to the budget of 10 points, it can be determined that 4 points, 2 points, and 1 point are distributed to the account 5, the account 6, and the account 8, respectively.

The third manner: an alternative step may include determining candidate distributing results according to the determined total distributing budget and the one or more pre-selected receiving accounts corresponding to the one or more pre-selected receiving identifiers; determining a receiving account according to the one or more pre-selected receiving accounts corresponding to the one or more pre-selected receiving identifiers; and determining a distributing result from the candidate distributing results according to the receiving account. For example, a candidate distributing result may be first determined according to the determined total distributing budget and pre-selected receiving accounts corresponding to the pre-selected receiving identifiers; then, similar to the step in the second manner, a receiving account may be determined from the pre-selected receiving accounts; a distributing result may then be determined from the candidate distributing results according to the receiving account.

For example, the account 1 is the sending account, the total distributing budget is 10 points, and the determined pre-selected receiving accounts are the account 5, the account 6, the account 7, and the account 8. First, candidate distributing results are determined that 4 points, 2 points, 3 points, and 1 point are distributed to the account 5, the account 6, the account 7, and the account 8, respectively. However, the account 7 does not have a friend relationship with the account 1, and therefore, a distributing result can be determined from the candidate distributing results, namely, it can be determined that 4 points, 2 points, and 1 point are distributed to the account 5, the account 6, and the account 8, respectively.

In other embodiments, a preset screening rule can also be made by the sending account. Determining a receiving account according to the pre-selected receiving accounts corresponding to the pre-selected receiving identifiers in the second manner or the third manner may include: determining a receiving account from the pre-selected receiving accounts corresponding to the pre-selected receiving identifiers according to an account screening rule preset by the sending account. For example, the account 1 is the sending account, the total distributing budget is 10 points, and the determined pre-selected receiving accounts are the account 5, the account 6, the account 7, and the account 8, but the account 1 presets that a white list of resource distributing includes the account 5 and the account 8. Then, the final distributing result can be that the account 1 distributes the Internet resources to the account 5 and the account 8.

In still other embodiments, a distributing result can also be determined by combining the first manner with the second manner or the third manner.

Step 27: according to the determined distributing result, distributing the Internet resources from the sending account to the receiving account.

This Step 27 is similar to Step 14 in the above embodiments, and will not be repeated here.

Using the method shown in FIGS. 6 and 7, facial features are used as a factor in determining a distributing result. When a facial image is collected in real time through an image collection device, users can participate in the resource distributing by using the variability of the facial features, which improves interactivity while improving the resource distributing efficiency. In addition, by presetting an account screening rule by the sending account, the interactivity is further improved.

Figure 8:
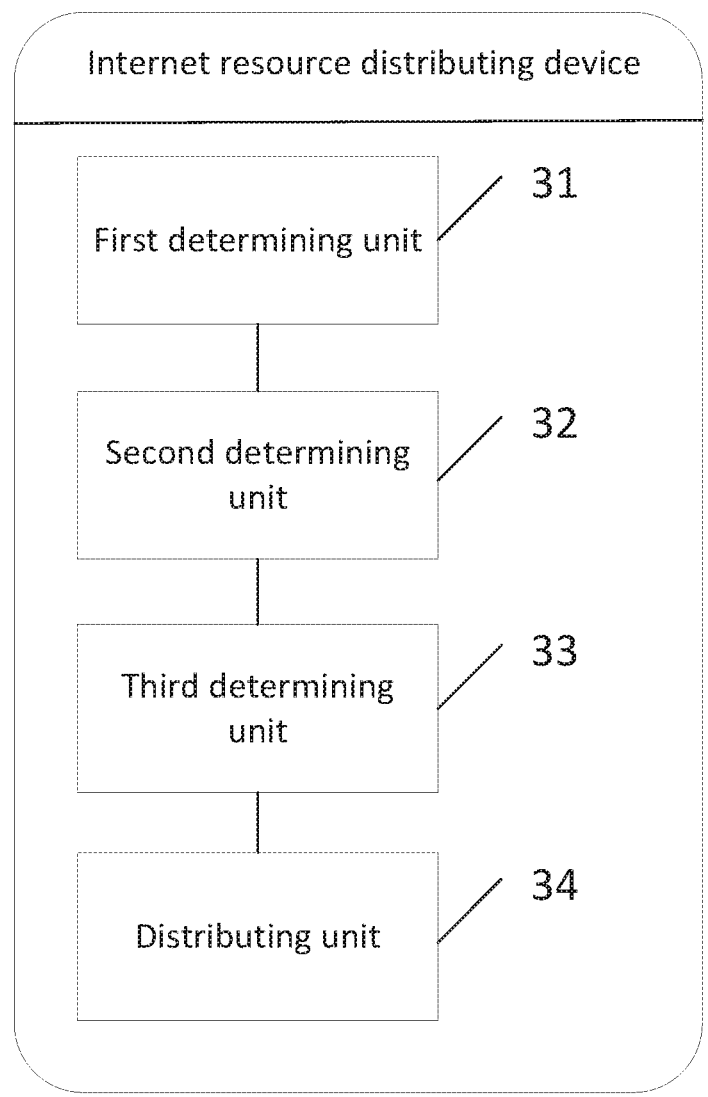
FIG. 8 is a schematic structural diagram of an Internet resource distributing device according to yet other embodiments of the application.

Based on the same concept, an Internet resource distributing device is provided for improving the resource distributing efficiency. FIG. 8 is a schematic structural diagram of the device, and the device comprises: a first determining unit 31, a second determining unit 32, a third determining unit 33, and a distributing unit 34, wherein the first determining unit 31 receives an Internet resource distributing request and determines one or more pre-selected receiving identifiers;

the second determining unit 32 determines a total distributing budget according to a resource value budget preset by a sending account;

the third determining unit 33 determines a distributing result according to the total distributing budget and one or more pre-selected receiving accounts corresponding to the one or more pre-selected receiving identifiers, wherein the distributing result includes a resource value for distributing an Internet resource from the sending account to a receiving account in the one or more pre-selected receiving accounts; and the distributing unit 34 distributes the Internet resource from the sending account to the receiving account according to the distributing result.

In some embodiments, the first determining unit can determine a facial identifier according to an obtained facial image, and determine the facial identifier as the pre-selected receiving identifier.

In other embodiments, the first determining unit can determine the facial identifier through facial recognition.

In still other embodiments, the first determining unit can determine candidate facial identifiers through facial recognition; obtain facial features corresponding to the candidate facial identifiers extracted from a facial recognition process; and determine the facial identifier from the candidate facial identifiers according to a preset feature screening rule.

In some embodiments, the third determining unit can determine a distributing result according to the total distributing budget and a pre-selected receiving account and facial features corresponding to the one or more pre-selected receiving identifier.

In other embodiments, the third determining unit can determine a receiving account according to the one or more pre-selected receiving accounts corresponding to the one or more pre-selected receiving identifiers; and determine a distributing result according to the total distributing budget and the receiving account.

In still other embodiments, the third determining unit can determine candidate distributing results according to the total distributing budget and the one or more pre-selected receiving accounts corresponding to the one or more pre-selected receiving identifiers; determine a receiving account according to the one or more pre-selected receiving accounts corresponding to the one or more pre-selected receiving identifiers; and determine a distributing result from the candidate distributing results according to the receiving account.

In yet other embodiments, the third determining unit can determine a receiving account from the one or more pre-selected receiving accounts corresponding to the one or more pre-selected receiving identifiers according to an account screening rule preset by the sending account.

Figure 9:
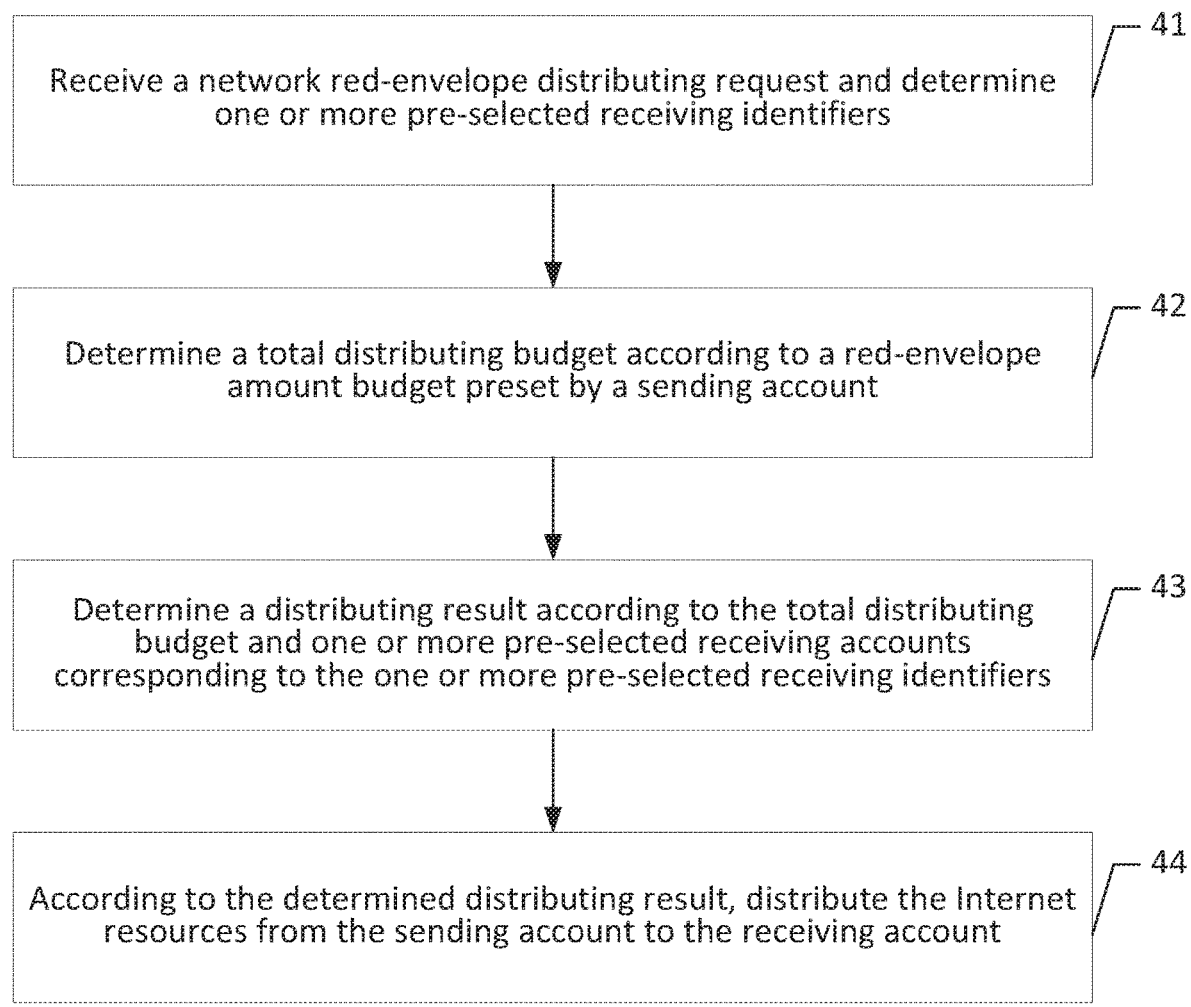
FIG. 9 is a flow chart of a network red-envelope distributing method according to other embodiments of the application.

Based on the same concept and as an extension, the present embodiments provide a network red-envelope distributing method. As an Internet information resource, funds are increasingly circulated in the Internet. In particular, with the development of mobile terminals and the Internet, network red-envelopes have become an emerging interaction manner. According to current technologies, the manner in which network red-envelopes are sent is similar to what is described in the Background, the sending account needs to execute multiple steps of operations, while the receiving account also needs to execute at least one step of operations. In other words, a terminal of the sending account needs to receive instructions for a number of times, and a terminal of the receiving account also needs to receive instructions, which severely affects the distributing efficiency of network red-envelopes. Therefore, based on the preceding embodiments, a network red-envelope distributing method is provided for improving the distributing efficiency of network red-envelopes. The flow chart of the method is shown in FIG. 9. Assuming that the execution entity is still a mobile terminal, the method comprises the following steps:

Step 41: receiving a network red-envelope distributing request and determining one or more pre-selected receiving identifiers.

Similar to the preceding embodiments, the determining pre-selected receiving identifiers in this step can also comprise: determining a facial identifier according to an obtained facial image; and determining the facial identifier as one of the pre-selected receiving identifiers.

Moreover, in some embodiments, the determining a facial identifier can comprise: determining the facial identifier through facial recognition.

Furthermore, in other embodiments, the determining the facial identifier through facial recognition can comprise: determining candidate facial identifiers through facial recognition; obtaining facial features corresponding to the candidate facial identifiers extracted from a facial recognition process; and determining the facial identifier from the candidate facial identifiers according to a preset feature screening rule.

The implementation manner is similar to the methods in the foregoing embodiments and will not be repeated.

Step 42: determining a total distributing budget according to a red-envelope amount budget preset by a sending account.

The implementation manner is similar to the methods in the foregoing embodiments and will not be repeated.

Step 43: determining a distributing result according to the total distributing budget and one or more pre-selected receiving accounts corresponding to the one or more pre-selected receiving identifiers.

When the facial identifier is determined and the pre-selected receiving identifiers are determined through facial recognition in Step 41, this step can comprise: determining a distributing result according to the determined total distributing budget and a pre-selected receiving account and facial features corresponding to the pre-selected receiving identifiers. This manner of determining a distributing result corresponds to the first manner in the foregoing embodiments.

Similarly, this step can also be performed through the other two manners described above.

For example, this step can comprise: determining a receiving account according to the pre-selected receiving accounts corresponding to the pre-selected receiving identifiers; and determining a distributing result according to the determined total distributing budget and the receiving account.

In another example, this step can further comprise: determining candidate distributing results according to the determined total distributing budget and pre-selected receiving accounts corresponding to the pre-selected receiving identifiers; determining a receiving account according to the pre-selected receiving accounts corresponding to the pre-selected receiving identifiers; and determining a distributing result from the determined candidate distributing results according to the receiving account.

In these two manners, the determining a receiving account according to the pre-selected receiving accounts corresponding to the pre-selected receiving identifiers can further comprise: determining a receiving account from the pre-selected receiving accounts corresponding to the pre-selected receiving identifiers according to an account screening rule preset by the sending account.

Step 44: according to the determined distributing result, distribute the Internet resources from the sending account to the receiving account.

Referring to the method shown in FIG. 9, after a terminal receives a network red-envelope distributing request and determines a pre-selected receiving identifier according to a user input, the distributing can be completed as a red-envelope amount budget has been preset. By presetting the red-envelope amount budget, a sending party can complete a distributing process through initiating a request and inputting a receiving account identifier when distributing network red-envelopes. Compared with the current technologies, many operations may be eliminated for the sending account from the complicated operations during the network red-envelope distributing, while the receiving party can have a unique identifier for receiving the network red-envelopes, thereby improving the network red-envelope distributing efficiency.

In addition, operations can only be executed online by terminals according to the current technologies. Although there is no limitation to geographic positions when the operations are executed via the Internet or the mobile Internet, the operations cannot be executed through offline interactions. For example, even when the sending party and the receiving party are face to face, they can only interact online to carry out the operations and cannot execute the operations through offline "communications." In the embodiments of the specification, when the distributing is carried out through facial images, offline interactions can be increased through, for example, taking group photos or individual photos for multiple times. If an image comprising a plurality of faces is obtained through an image collection device, resource distributing can be achieved through one sending of a request and one photo taking for each network red-envelope distributing, which improves the network red-envelope distributing efficiency to the maximum degree and moreover, increases offline interactions.

A person skilled in the art should understand that the embodiments of the application may be provided as a method, a system, or a computer program product. Therefore, the application may be implemented as a complete hardware embodiment, a complete software embodiment, or an embodiment combing software and hardware. Moreover, the application may be in the form of a computer program product implemented on one or more computer usable storage media (including, but not limited to, a magnetic disk memory, CD-ROM, an optical memory, and the like) comprising computer usable program codes therein.

The embodiments are described with reference to the flow charts and/or block diagrams of the method, device (system), and computer program product according to the application. It should be understood that every process and/or block of the flow charts and/or block diagrams and a combination of processes and/or blocks of the flow charts and/or block diagrams can be implemented by computer program instructions. These computer program instructions can be provided to a general-purpose computer, a dedicated computer, an embedded processor, or a processor of another programmable data processing device, thereby producing a machine and causing the instructions to, when executed by the computer or the processor of another programmable data processing device, produce an apparatus for implementing functions specified in one or more processes in the flow charts and/or one or more blocks in the block diagrams.

These computer program instructions can also be stored in a computer readable storage medium capable of guiding a computer or other programmable data processing devices to work in a particular manner, causing the instructions stored in the computer readable storage medium to produce a manufactured article that includes an instruction device for implementing functions specified in one or more processes in the flow charts and/or one or more blocks in the block diagrams.

These computer program instructions can also be loaded onto a computer or other programmable data processing devices, causing a series of operation steps to be executed on the computer or other programmable data processing devices to produce a process of computer implementation. As a result, the instructions executed on the computer or other programmable data processing devices provide steps to implement functions specified in one or more processes in the flow charts and/or one or more blocks in the block diagrams.

In a typical configuration, a computation device includes one or more processors (CPUs), input/output interfaces, network interfaces, and a memory.

The memory may include computer readable media, such as a volatile memory, a Random Access Memory (RAM), and/or a non-volatile memory, e.g., a Read-Only Memory (ROM) or a flash RAM. The memory is an example of a computer readable medium.

Computer readable media include permanent, volatile, mobile and immobile media, which can implement information storage through any method or technology. The information may be computer readable instructions, data structures, program modules or other data. Examples of storage media of computers include, but are not limited to, Phase-change RAMs (PRAMs), Static RAMs (SRAMs), Dynamic RAMs (DRAMs), other types of Random Access Memories (RAMs), Read-Only Memories (ROMs), Electrically Erasable Programmable Read-Only Memories (EEPROMs), flash memories or other memory technologies, Compact Disk Read-Only Memories (CD-ROMs), Digital Versatile Discs (DVDs) or other optical memories, cassettes, cassette and disk memories or other magnetic memory devices or any other non-transmission media, which can be used for storing information accessible to a computation device. According to the definitions herein, the computer readable media do not include transitory media, such as modulated data signals and carriers.

It should be further noted that the terms of "including," "comprising" or any other variants thereof intend to encompass a non-exclusive inclusion, causing a process, method, commodity or device comprising a series of elements to not only comprise these elements, but also comprise other elements that are not specifically listed, or further comprise elements that are inherent to the process, method, commodity or device. When there is no further restriction, elements defined by the statement "comprising one . . . " do not exclude that a process, method, commodity or device comprising the above elements further comprises additional identical elements.

A person skilled in the art should understand that the embodiments of the application may be provided as a method, a system, or a computer program product. Therefore, the application may be implemented as a complete hardware embodiment, a complete software embodiment, or an embodiment combing software and hardware. Moreover, the application may be in the form of a computer program product implemented on one or more computer usable storage media (including, but not limited to, a magnetic disk memory, CD-ROM, an optical memory, and the like) comprising computer usable program codes therein.

Only embodiments of the application are described above, which are not used to limit the application. To a person skilled in the art, the application may have various modifications and changes. Any modification, equivalent substitution or improvement made within the spirit and principle of the application shall be encompassed by the claims of the application.

What is claimed is:

1. A resource distributing method, comprising:
   receiving, by a terminal, a resource distributing request from a sending account;
   determining, by the terminal, in response to the resource distributing request, a plurality of candidate facial identifiers from at least one image through a facial recognition process;
   sorting, by the terminal, the plurality of candidate facial identifiers based on a preset facial feature screening rule to obtain a sorting result;
   determining, by the terminal, at least one facial identifier from the plurality of candidate facial identifiers based on the preset facial feature screening rule and the sorting result;
   determining, by the terminal, one or more pre-selected receiving accounts corresponding to the at least one facial identifier;
   determining, by the terminal, a receiving account from the one or more pre-selected receiving accounts by filtering out at least one excluded account, wherein the receiving account is determined according to an account screening rule preset by the sending account;
   determining, by the terminal, a total distributing budget for distributing a resource;
   determining, by the terminal, a distributing result according to the total distributing budget, the sorting result, and the receiving account, wherein the distributing result includes a resource value based on which the resource is to be distributed from the sending account to the receiving account in the one or more pre-selected receiving accounts; and
   distributing, by the terminal, the resource from the sending account to the receiving account according to the distributing result.

2. The method according to claim 1, wherein the determining by the terminal, the at least one facial identifier comprises:
   obtaining facial features corresponding to the plurality of candidate facial identifiers extracted from the facial recognition process; and
   determining the at least one facial identifier from the plurality of candidate facial identifiers according to the facial features and the preset facial feature screening rule.

3. The method according to claim 2, wherein the determining, by the terminal, the distributing result according to the total distributing budget, the sorting result, and the receiving account comprises:

determining the distributing result according to the total distributing budget, the receiving account, and facial features corresponding to the at least one facial identifier.

4. The method according to claim 1, wherein the determining, by the terminal, the distributing result according to the total distributing budget, the sorting result, and the receiving account comprises:
determining candidate distributing results according to the total distributing budget and the one or more pre-selected receiving accounts corresponding to the at least one facial identifier; and
determining the distributing result from the candidate distributing results according to the receiving account.

5. A resource distributing device, comprising: one or more processors and one or more non-transitory computer-readable memories coupled to the one or more processors and configured with instructions executable by the one or more processors to cause the device to perform operations comprising:
receiving, by the resource distributing device, a resource distributing request from a sending account;
determining, by the resource distributing device, in response to the resource distributing request, a plurality of candidate facial identifiers from at least one image through a facial recognition process;
sorting, by the resource distributing device, the plurality of candidate facial identifiers based on a preset facial feature screening rule to obtain a sorting result;
determining, by the resource distributing device, at least one facial identifier from the plurality of candidate facial identifiers based on the preset facial feature screening rule and the sorting result;
determining, by the resource distributing device, one or more pre-selected receiving accounts corresponding to the at least one facial identifier;
determining, by the resource distributing device, a receiving account from the one or more pre-selected receiving accounts by filtering out at least one excluded account, wherein the receiving account is determined according to an account screening rule preset by the sending account;
determining, by the resource distributing device, a total distributing budget for distributing a resource;
determining, by the resource distributing device, a distributing result according to the total distributing budget, the sorting result, and the receiving account, wherein the distributing result includes a resource value based on which the resource is to be distributed from the sending account to the receiving account in the one or more pre-selected receiving accounts; and
distributing, by the resource distributing device, the resource from the sending account to the receiving account according to the distributing result.

6. The device according to claim 5, wherein the determining by the terminal, the at least one facial identifier comprises:
obtaining facial features corresponding to the plurality of candidate facial identifiers extracted from the facial recognition process; and
determining the at least one facial identifier from the plurality of candidate facial identifiers according to the facial features and the preset facial feature screening rule.

7. The device according to claim 6, wherein the determining, by the terminal, the distributing result according to the total distributing budget, the sorting result, and receiving account comprises:
determining the distributing result according to the total distributing budget, the receiving account, and facial features corresponding to the at least one facial identifier.

8. A non-transitory computer-readable storage medium configured with instructions executable by one or more processors to cause the one or more processors to perform operations comprising:
receiving a red-envelope distributing request from a sending account;
determining, in response to the resource distributing request, a plurality of candidate facial identifiers from at least one image through a facial recognition process;
sorting the plurality of candidate facial identifiers based on a preset facial feature screening rule to obtain a sorting result;
determining at least one facial identifier from the plurality of candidate facial identifiers based on the preset facial feature screening rule and the sorting result;
determining one or more pre-selected receiving accounts corresponding to the at least one facial identifier;
determining a receiving account from the one or more pre-selected receiving accounts by filtering out at least one excluded account, wherein the receiving account is determined according to an account screening rule preset by the sending account;
determining a total distributing budget for distributing one or more red-envelopes;
determining a distributing result according to the total distributing budget, the sorting result, and the receiving account, an amount based on which the one or more red-envelopes are to be distributed from the sending account to the receiving account in the one or more pre-selected receiving accounts; and
distributing the one or more red-envelopes from the sending account to the receiving account according to the distributing result.

9. The storage medium according to claim 8, wherein the determining by the terminal, the at least one facial identifier comprises:
obtaining facial features corresponding to the plurality of candidate facial identifiers extracted from the facial recognition process; and
determining the at least one facial identifier from the plurality of candidate facial identifiers according to the facial features and the preset facial feature screening rule.

10. The storage medium according to claim 9, wherein the determining, by the terminal, the distributing result according to the total distributing budget, the sorting result, and the receiving account comprises:
determining the distributing result according to the total distributing budget, the receiving account, and facial features corresponding to the at least one facial identifier.

11. The storage medium according to claim 8, wherein the determining, by the terminal, the distributing result according to the total distributing budget, the sorting result, and the receiving account comprises:
determining candidate distributing results according to the total distributing budget and the one or more pre-selected receiving accounts corresponding to the at least one facial identifier; and determining the distributing result from the candidate distributing results according to the receiving account.

* * * * *